US008576536B2

(12) United States Patent
Rossi et al.

(10) Patent No.: US 8,576,536 B2
(45) Date of Patent: Nov. 5, 2013

(54) DEVICE FOR PROTECTING AN ELECTRONIC PRINTED CIRCUIT BOARD

(75) Inventors: Laurent Rossi, Dreux (FR); Bernard Schang, Le Mesnil Saint Denis (FR)

(73) Assignee: Compagnie Industrielle et Financiere d'Ingenierie "Ingenico", Neuilly-sur-Seine (FR)

( * ) Notice: Subject to any disclaimer, the term of this patent is extended or adjusted under 35 U.S.C. 154(b) by 40 days.

(21) Appl. No.: 13/233,573

(22) Filed: Sep. 15, 2011

(65) Prior Publication Data

US 2012/0063046 A1    Mar. 15, 2012

(30) Foreign Application Priority Data

Sep. 15, 2010    (FR) ...................................... 10 57381

(51) Int. Cl.
     *H01H 9/28*      (2006.01)
(52) U.S. Cl.
     USPC .......................................... 361/271; 361/272
(58) Field of Classification Search
     USPC ........................................... 361/78, 271, 272
     See application file for complete search history.

(56) References Cited

U.S. PATENT DOCUMENTS

| | | | |
|---|---|---|---|
| 5,446,391 A * | 8/1995 | Aoki et al. .................... | 324/661 |
| 6,390,367 B1 | 5/2002 | Doig | |
| 6,853,093 B2 | 2/2005 | Cohen et al. .................. | 257/678 |
| 6,983,378 B1 | 1/2006 | Kokubo | |
| 7,015,823 B1 | 3/2006 | Gillen et al. | |
| 7,024,565 B1 | 4/2006 | Beiley et al. .................. | 713/194 |
| 2007/0295810 A1 | 12/2007 | Hopt et al. | |
| 2007/0296709 A1 * | 12/2007 | GuangHai ..................... | 345/173 |
| 2008/0278355 A1 | 11/2008 | Moore et al. | |
| 2009/0058628 A1 | 3/2009 | Kirmayer | |
| 2010/0090714 A1 | 4/2010 | Van Geloven et al. ........ | 324/705 |
| 2011/0095919 A1 | 4/2011 | Ostermoller et al. | |

FOREIGN PATENT DOCUMENTS

| | | |
|---|---|---|
| EP | 1804557 A1 | 7/2007 |
| EP | 1873680 A1 | 1/2008 |
| EP | 1927931 A1 | 6/2008 |
| FR | 2857113 A1 | 1/2005 |
| WO | 2009103594 A1 | 8/2009 |
| WO | 2010007314 A2 | 1/2010 |

OTHER PUBLICATIONS

French Search Report dated May 24, 2011 for corresponding French Application No. FR1057387, filed Sep. 15, 2010.
French Search Report dated May 18, 2011 for corresponding French Application No. FR1057385, filed Sep. 15, 2010.

(Continued)

*Primary Examiner* — Danny Nguyen
(74) *Attorney, Agent, or Firm* — David D. Brush; Westman, Champlin & Koehler, P.A.

(57) ABSTRACT

A device is provided for protecting an electronic printed circuit board, which includes at least two layers. The device includes on a layer, at least one conductive part uniformly spread on an insulator layer, the entirety comprising the conductive part and the insulator layer forming a capacitive support presenting a uniform electrical field. The capacitive support is placed roughly on the whole surface of one of the layers of the multi-layered electronic printed circuit board. The capacitive support is configured to deliver a reference capacitance. A capacitive measurement microprocessor detects a variation in capacitance. A transmitter is configured for transmitting a piece of information representing the variation in capacitance when an absolute value of a difference between the measured capacitance and the reference capacitance exceeds a predetermined threshold.

9 Claims, 4 Drawing Sheets

(56) References Cited

OTHER PUBLICATIONS

French Search Report dated Aug. 12, 2011 for corresponding French Application No. FR1057383, filed Sep. 15, 2010.

French Search Report dated May 17, 2011 for corresponding French Application No. FR1057381, filed Sep. 15, 2010.
Machine English translation of WIPO Patent Application Publication to Inventor Pierre Lacroix. WO 2010/007314 A2, Jan. 21, 2010. Translation of pp. 1-15 created on Aug. 11, 2013.

* cited by examiner

DEVICE FOR PROTECTING AN ELECTRONIC PRINTED CIRCUIT BOARD

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the protection of memory card reading devices. Memory card reading devices are used in many apparatuses such as payment terminals, authentication or identification devices or again content-reading devices.

The present disclosure pertains more particularly to the securing of the multi-layered electronic printed circuit boards of such memory card reading devices in order to protect them against any intrusion by malicious third parties.

BACKGROUND OF THE DISCLOSURE

Apparatuses incorporating memory card reading devices such as payment terminals include many securing devices and implement methods for ensuring that the apparatuses are employed in compliance with the use for which they are planned and that they comply with security standards laid down by certification organizations.

For example, in the field of payment terminals for payment cards, the manufacturers have developed solutions for protecting the multi-layered electronic printed circuit board or boards (PCBs) of the payment terminals.

More specifically, a printed circuit board is a carrier, generally a plate, used to electrically connect a set of electronic components to one another in order to obtain a complex electronic circuit. This plate consists of an assembly of several fine layers of copper separated by an insulating material. The layers of copper are etched by a chemical method to obtain a set of tracks terminated by chips. The printed circuit board is often coated with a layer of colored varnish (prepreg+ FR4) which protects the tracks from oxidation and possible short circuits. The tracks electrically connect different zones of the printed circuit. The chips, once perforated, set up an electrical link either between the soldered components through the printed circuit board or between the different layers of copper (this is the so-called "via" technique). In certain cases, the non-perforated chips are used to solder surface-mounted components.

Unfortunately, deterioration has been observed in multi-layered electronic printed circuit boards. This deterioration takes the form of piercing, scraping or any other intrusive technique aimed at shorting, cutting, snooping, etc. a printed circuit board.

For example, a deterioration may correspond to the cutting of a track of the printed circuit of a payment terminal in order to annihilate the dispatch of information aimed at triggering the "attack" mode of the secured processor of a payment terminal.

In order to protect the multi-layered electronic printed circuit, protection solutions have been developed.

A first protection consists in introducing a sort of wire mesh with activation on electrical levels. These are fine adjacent tracks covering the entire part to be protected. For example, one track can be connected to VCC and the other to GND. Any piercing of this wire mesh can result in the cutting of one or other of the links, which would be detected. It could even result in shorting between two tracks, which would also be detected. Numerous variations of this device can be used. The detection can be done on voltage levels or on the compliance of the signals travelling through these tracks.

A second protection consists in introducing a wire mesh similar to that of the first solution described here above and comparing the voltage characteristics of a signal sent at one end of the mesh with the characteristics of a signal received at the other end.

The drawback of these solutions lies in the fact that there is a space, however tiny it may be, between the different tracks. This enables a possible shorting or again piercing without activation on an electrical level or again without modification of the characteristics of the signal received at the end of the wire mesh as compared with the characteristics of the signal sent at another end.

Thus, to date, the inventors have not identified any already existing simple solution for providing efficient protection to a multi-layered electronic printed circuit board against any intrusion by malicious third parties.

SUMMARY

An exemplary embodiment of the invention does not have these drawbacks of the prior art.

An embodiment of the invention pertains to a device for protecting an electronic printed circuit board, said electrical printed circuit board comprising at least two layers. According to an embodiment of the invention, such a device comprises:

at least one conductive part uniformly spread on an insulator layer, the entirety comprising the conductive part and the insulator layer forming a capacitive support presenting a uniform electrical field, said capacitive support being placed roughly on the whole surface of one of the layers of the multi-layered electronic printed circuit board, said capacitive support being configured to deliver a reference capacitance;

a capacitive measurement microprocessor electrically connected to said at least one capacitive support, said at least one microprocessor being configured to detect a variation in capacitance of said at least one capacitive support;

means for transmitting a piece of information representing said variation in capacitance when an absolute value of a difference between said measured capacitance and said reference capacitance exceeds a predetermined threshold.

According to one particular embodiment, said device for protecting uses an existing support (wire mesh) and performs a measurement of capacitance on said support.

Thus, it is not necessary to make modifications to this circuit to implement protection.

According to one particular characteristic of an embodiment of the invention, said device for protecting further comprises calibration means delivering said reference capacitance.

Thus, it is possible to subsequently measure a variation relatively to this reference.

According to one particular characteristic, said device for protecting further comprises a system of compensation for ambient conditions modifying said reference capacitance as a function of a predetermined criterion.

According to one particular embodiment, said at least one capacitive support is positioned on an internal layer of said printed circuit.

Thus, an embodiment of the invention offers protection within the printed circuit itself.

According to one particular characteristic, said at least one capacitive support is deployed in a full plane.

According to one particular characteristic, said at least one capacitive support is deployed as a lattice.

According to another aspect, an embodiment of the invention also pertains to a method for protecting an electronic printed circuit board, said printed circuit comprising at least two layers. According to an embodiment of the invention, such a method comprises:

- a step for laying out at least one conductive part uniformly spread on an insulator layer, the entirety comprising the conductive part and the insulator layer forming a capacitive support presenting a uniform electrical field, said capacitive support being placed roughly on the whole surface of one of the layers of the multi-layered electronic printed circuit board, said capacitive support being configured to deliver a reference capacitance;
- a step for capacitive measuring implemented by a capacitive measurement microprocessor electrically connected to said at least one capacitive measurement support, said at least one microprocessor being configured to detect a variation in capacitance of said at least one capacitive support;
- a step for transmitting a piece of information representing said variation in capacitance, when an absolute value of a difference between said measured capacitance and said reference capacitance exceeds a predetermined threshold.

According to one particular characteristic, said method for protecting furthermore comprises a calibration step delivering said reference capacitance.

According to another form, an embodiment of the invention pertains to a payment terminal characterized in that it comprises at least one device for protecting as referred to here above.

An embodiment of the invention also pertains to a computer program comprising program code instructions to implement the method for protecting as referred to here above, when the program is executed by a processor.

BRIEF DESCRIPTION OF THE DRAWINGS

Other characteristics and advantages shall appear more clearly from the following description of a preferred embodiment, given by way of a simple illustratory and non-exhaustive example, and from the appended drawings, of which.

DETAILED DESCRIPTION OF ILLUSTRATIVE EMBODIMENTS

1. Reminder of the Principle of an Embodiment of the Invention

An embodiment of the invention proposes to efficiently and simply protect the layers of a multi-layered electronic printed circuit board by using a device for protecting implementing capacitive measurement of at least one conductive part uniformly spread on an insulator layer, the entirety comprising the conductive part and the insulator layer forming a capacitive support presenting a uniform electrical field, the capacitive support being placed roughly on the whole surface of one of the layers of the multi-layered electronic printed circuit board.

Since the device for protecting implements a capacitive measurement, an intrusion, by shorting or by piercing for example, is detected because the intrusion modifies the reference capacitance of the capacitive support beyond a predetermined threshold.

According to an embodiment of the invention, the device for protecting an electronic printed circuit board comprises a capacitive support, a capacitive measurement microprocessor and a transmitter configured for transmitting a piece of information reporting a variation in the capacitance of the capacitive support beyond a predetermined threshold, in other words reporting an intrusion by a malicious third party.

According to one embodiment of the invention, the capacitive support is deployed on a layer of the printed circuit in a full plane.

According to another embodiment, a capacitive support in the form of a lattice is considered. It is also possible to consider a capacitive support in the form of a single copper track.

According to an embodiment of the invention, the protection device is capable of protecting an electronic printed circuit comprising several superimposed layers of printed circuit connected to one another by buried vias. Such a protection device can take any form whatsoever. The shape of the device can be adapted to the printed circuit board to be protected.

Here below, we present an embodiment of a device for protecting according to the invention. It is clear however that the invention is not limited to this particular application, but can also be implemented in many other contexts of protection of electronic printed circuit boards and more generally in any case where the characteristics listed here below are of interest.

Figure 1:
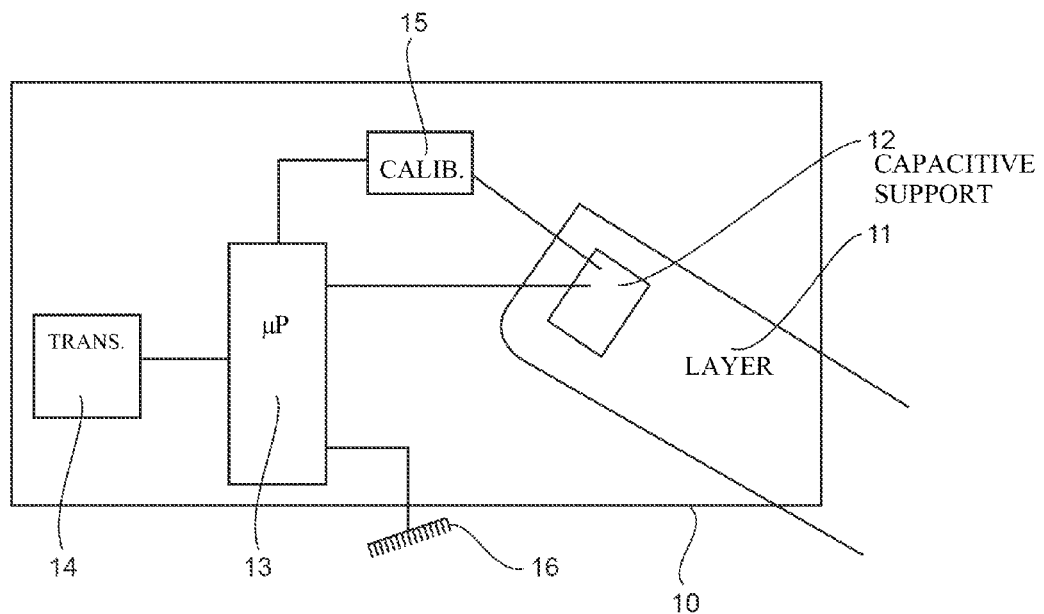
FIG. 1 illustrates a device for protecting according to an embodiment of the invention.

2. Description of an Embodiment of a Device 2.1 Structure of the Device for Protecting Referring to FIG. 1, we present an embodiment in which the device for protecting 10 first of all comprises a capacitive support 12 corresponding to a full plane and being positioned on a layer 11 of the electronic printed circuit board of a payment terminal for example.

A capacitive support corresponding to a full plane takes the form of a capacitive surface. More specifically, a surface capacitive technology consists for example of a uniform conductive coating on an insulator. During use, electrodes placed on the edge of the insulator distribute a low-voltage current equally throughout the conductive layer, thus creating a uniform electrical field. When an object comes into contact with or approaches the surface, this draws the current from every side of the electrical field.

Optionally, a controller computes the coordinates of the contact by measuring the current. It then transmits these coordinates to the secured processor of the payment terminal.

Besides, calibration means (such as a circuit) 15, electrically connected to the capacitive support, enable the reference capacitance of this support to be evaluated. The calibration circuit 15 shall be described in greater detail here below.

In addition, the device for protecting according to an embodiment of the invention also has a capacitive measurement microprocessor 13 electrically connected to the capacitive support 12 and to the ground 16. Such a measurement microprocessor uses for example a capacitive sensor corresponding to a probe to measure the capacitance of the capacitive support.

Such a probe may for example be made with a flat measurement electrode surrounded by a guard ring. The electrode then, with the capacitive support, forms a plane capacitor. A guard electrode contained in the guard ring is placed around the measurement electrode, and its potential is taken to the same value in order to improve the linearity by making the field lines normal (i.e. perpendicular) to the measuring electrode. The guard electrode thus eliminates edge effects.

Through these measuring means (including the microprocessor) 13, a variation of the capacitance of the capacitive support is detected. This variation is for example obtained by comparing the measured capacitance with the reference capacitance determined by the calibration circuit 15. This measurement is preferably done in real time in order to instantaneously alert the secured processor of a payment terminal through transmitter 14.

Independently of the measurement frequency selected by the user, all the measurements are driven by a computer program recorded within the measuring means.

More specifically, the measuring microprocessor determines a difference between the capacitance of the capacitive support measured by the measuring microprocessor 13 and the reference capacitance preliminarily determined by the calibration circuit. If the absolute value of this difference exceeds a predetermined threshold S, the transmitter of the device for protecting according to an embodiment of the invention tell the secured processor of the secured terminal to go into "attack" mode.

Thus, the device for protecting according to an embodiment of the invention makes it possible to determine any contact with or approach towards the capacitive support positioned on a layer of the electronic printed circuit board to be protected. In particular, any intrusion by a malicious third party will be detected, because this intrusion, especially by cutting, shorting or by scraping, significantly modifies the capacitance of the capacitive support.

Furthermore, this device for protecting makes use of the capacitive support and the capacitive measurement by avoiding implementation of a complex geometrical routing or by not using hardware that can easily deteriorate.

2.2 Calibration of the Considered Capacitive Support

The calibration implemented by the calibration circuit 15 is needed because the value of the capacitance is sensitive.

Indeed, it is known that the value of the capacitance varies according to different factors. For example, the capacitance of a capacitive detector varies as a function of the charge hysteresis due to the magnetization of a material, the effect of a battery of the payment terminal or the temperature, humidity, aging especially by oxidation of the materials constituting the capacitive detector, etc.

Figure 2:
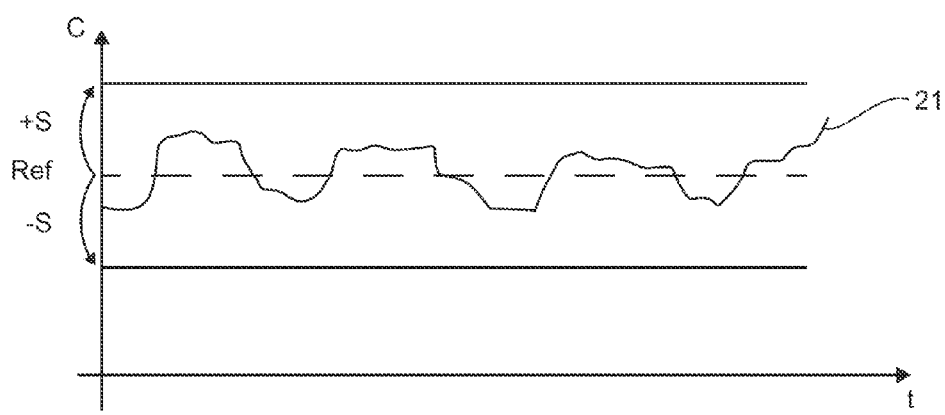
FIG. 2 illustrates calibration curves of the protection device according to an embodiment of the invention.

FIG. 2, presenting an example of calibration curves of the device for protecting according to an embodiment of the invention, represents the procedure implemented by the calibration circuit delivering the reference capacitance of the capacitive support.

The calibration circuit measures 21 (for example in a manner similar to that used by the above-described measurement means) the capacitance of the capacitive support as a function of time. The measurement curve 21 shown in FIG. 2 attests to the fact that the capacitance varies as a function of time, especially as a function of the ambient temperature.

The calibration circuit takes the average of the capacitance measurement data on the measurement curve so that a reference value Ref is obtained.

In addition, the calibration circuit determines for example a variation threshold S of capacitance beyond which the variation in capacitance is abnormal. Thus, the calibration circuit determines the range of value of capacitance centered on the reference value making it possible to attest to a "normal" and secured operation of the printed circuit of the payment terminal.

Preferably, the reference value and the predetermined threshold S are recorded in a memory and transmitted to the measuring means so that these means determine an intrusion by a malicious third party aimed at damaging the electronic printed circuit board.

Optionally, the calibration circuit further includes a system of environmental compensation aimed at adapting the reference value and predetermined threshold value S as a function of a parameter selected by the user of the payment terminal.

For example, since the ambient temperature in Singapore is very different from the temperature in Stockholm, the user adapts the capacitance reference and the authorized range of capacitance variation to the location.

Similarly, in another example, the user can adapt this range of variation as and when the payment terminal ages, according to the manufacturer's recommendations set forth in a user's instruction sheet.

3. Alternative Embodiments 3.1 Type of Capacitive Support

Figure 3A:
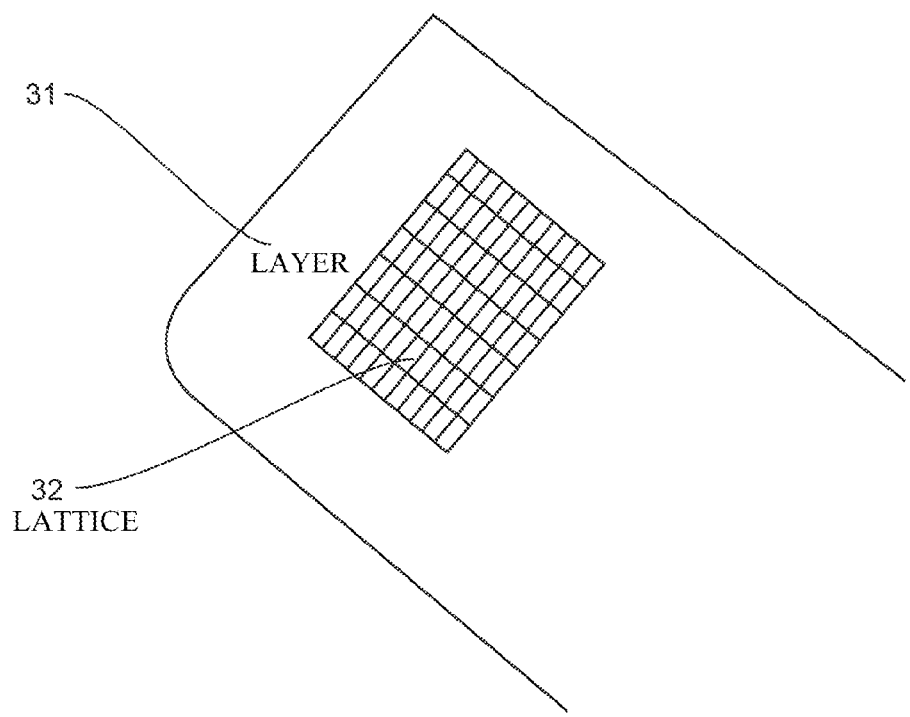
FIGS. 3A and 3B respectively present a capacitive support according to an embodiment of the invention as well as a section of the structure of a multi-layered electronic printed circuit board.
Figure 3B:
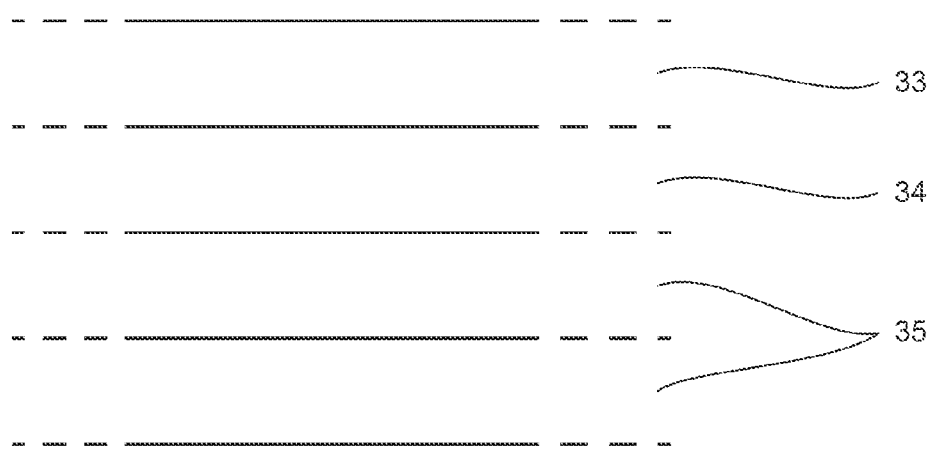

In another embodiment, the capacitive support may take the form of a lattice of very fine (less than 10 μm) conductive wires buried between layers of insulator, for example glass or laminated plastic films, as illustrated in FIG. 3A.

Such a lattice 32 may be plane or three-dimensional with a mesh more of greater or lesser density.

A capacitive support taking the form of a single copper track (not shown) can also be used.

Furthermore, the device for protecting according to an embodiment of the invention can also be electrically connected to a printed circuit board having an existing capacitive support constituted by a conductive part and an insulator part. In this case, the protection device of an embodiment of the invention places electrodes on the edge of the insulator in order to distribute a low-voltage current equally throughout the conductive part, thus creating a uniform electrical field. The existing support is thus made capacitive.

3.2 Arrangement of the Capacitive Support

Preferably, the capacitive support is on an internal layer 34 situated for example directly beneath an external layer 33 bearing a ground plane.

Indeed, this arrangement is used especially to protect the capacitive support and ensure a more stable measurement of the capacitance. The lower layers 35, i.e. the internal layers situated beneath the layer bearing the capacitive support, are therefore protected against intrusions by malicious third parties.

According to one alternative embodiment, the capacitive support can also be deployed in a "deeper" internal layer, subject to a ground plane being inserted on a directly neighboring layer so as to protect the capacitive support from possible electromagnetic disturbance due to internal electronic circuits (for example tracks) of the multi-layered electronic printed circuit board.

Depending on the level of protection sought, the number of capacitive supports implemented for a printed circuit board can be great. For example, each layer of the printed circuit board can carry a capacitive support in order to determine the depth of the intrusion.

In this case, the measuring means of each of the capacitive supports may successively perform measurements of capacitance of each layer as a function of the depth of the layer considered.

4. Description of an Embodiment of the Method for Protecting

Figure 4:
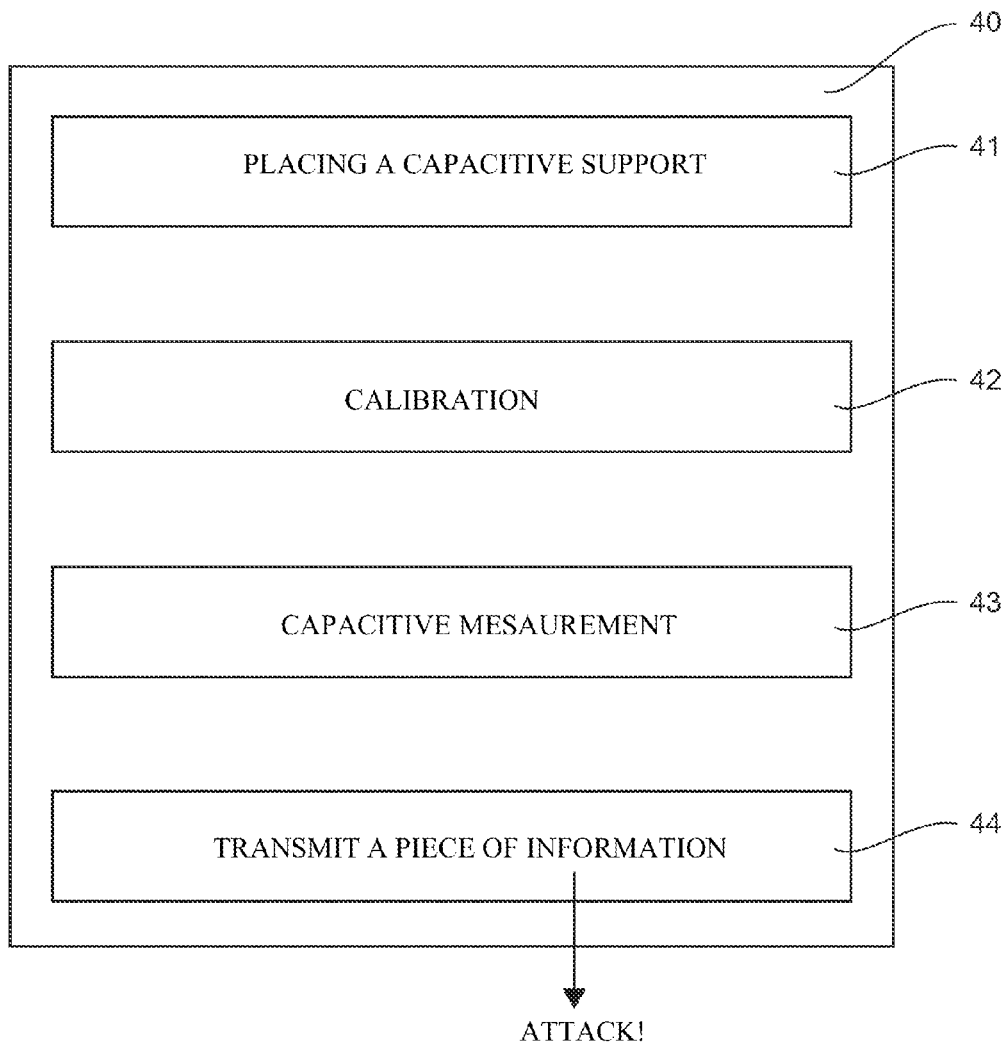
FIG. 4 illustrates the method for protecting according to an embodiment of the invention.

Referring to FIG. 4, we present the method for protecting 40 an electronic printed circuit board according to an embodiment of the invention.

Such a method comprises:
- a step 41 for placing at least one capacitive support on a layer of the printed circuit board of the payment terminal,
- a calibration step 42 delivering the reference capacitance of the capacitive support,
- a capacitive measurement step 43 implemented by a capacitive measurement microprocessor electrically connected to the capacitive support, the microprocessor being configured to detect a variation in capacitance of the capacitive support,
- a step 44 for transmitting a piece of information "attack!" representing the variation in capacitance when an absolute value of a difference between the measured capacitance and the reference capacitance exceeds a predetermined threshold.

In addition, the calibration step could be reiterated according to a utilization procedure known by the user.

According to one particular embodiment, the calibration step further comprises a step of environmental compensation aimed at taking into account the natural influence of certain parameters such as: the charge hysteresis due to the magnetization of a material, the effect of a battery of the payment terminal, or again temperature, humidity, ageing especially through the oxidation of the materials constituting the capacitive support, etc.

Figure 5:
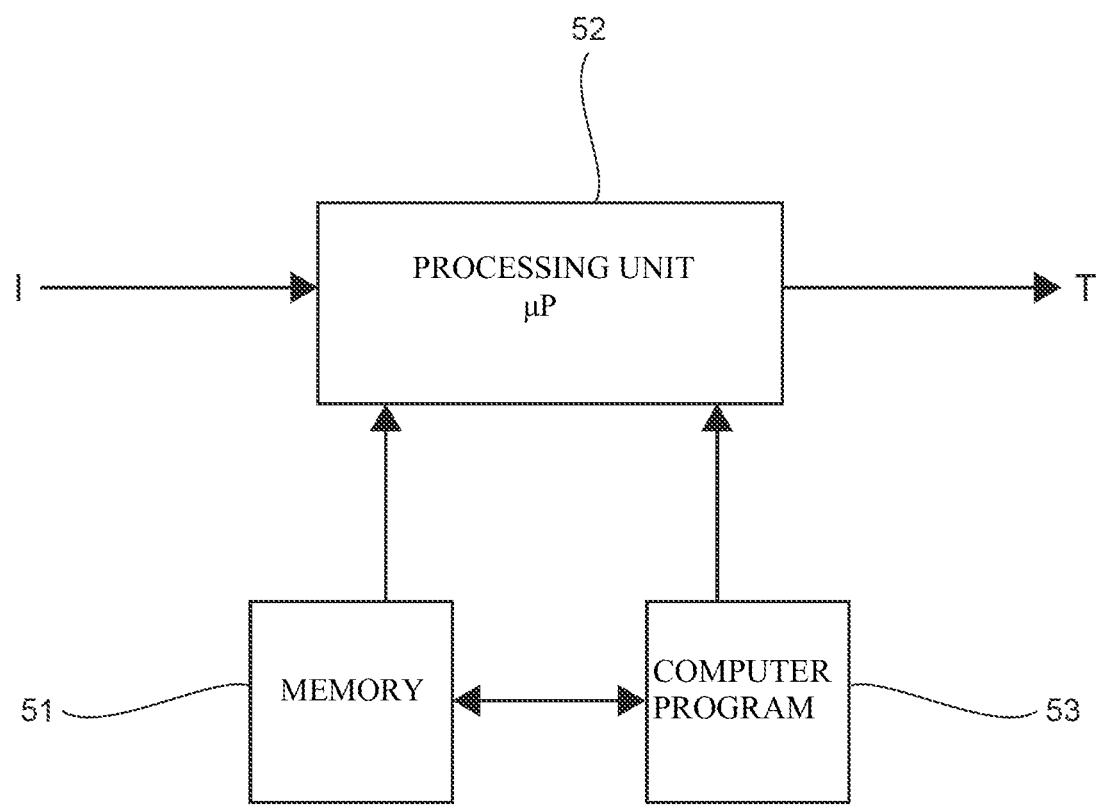
FIG. 5 is a schematic view of a payment terminal according to an embodiment of the invention.

Referring to FIG. 5, we present an embodiment of a payment terminal.

Such a terminal comprises a memory 51 constituted by a buffer memory, a processing unit 52, equipped for example with a microprocessor and driven by the computer program 53 implementing the protection method of an embodiment of the invention.

At initialization, the computer program code instructions 53 are loaded for example into a RAM and then executed by the processor of the processing unit 52. The processing unit 52 inputs at least one piece of information I, such as location zone identifiers. The microprocessor of the processing unit 52 implements the steps of the protection method described here above according to the instructions of the computer program 53 to deliver a piece of processed information T such as the detection of an attack leading to the elimination of the protected data. To this end, in addition to the buffer memory 51, the terminal comprises at least one capacitive support placed on a layer of said printed circuit, said at least one capacitive support being configured to deliver a reference capacitance, a capacitive measurement microprocessor electrically connected to said at least one capacitive support, said at least one microprocessor being configured to detect a variation in capacitance of said at least one capacitive support, the transmitter for transmitting a piece of information representing said variation in capacitance when an absolute value of a difference between said measured capacitance and said reference capacitance exceeds a predetermined threshold.

These elements are driven by the microprocessor of the processing unit 52. Although the present disclosure has been described with reference to one or more examples, workers skilled in the art will recognize that changes may be made in form and detail without departing from the scope of the disclosure and/or the appended claims.

The invention claimed is:

1. A device for protecting an electronic printed circuit board, said electrical printed circuit board comprising at least two layers, wherein the device comprises:
   - a conductive part uniformly spread on an insulator layer, the entirety comprising the conductive part and the insulator layer forming a capacitive support presenting a uniform electrical field over the whole surface of one of the layers of the electronic printed circuit board, said capacitive support being placed on the whole surface and being configured to deliver a reference capacitance for the whole surface;
   - a capacitive measurement microprocessor electrically connected to said capacitive support, said microprocessor being configured to detect a variation in capacitance of said capacitive support for said whole surface; and
   - a transmitter configured for transmitting a piece of information representing said variation of capacitance when an absolute value of a difference between a capacitance measured by said capacitive measurement microprocessor and said reference capacitance exceeds a predetermined threshold.

2. The device for protecting according to claim 1, wherein the device further comprises calibration means delivering said reference capacitance.

3. The device for protecting according to claim 1, wherein said capacitive support is positioned on an internal layer of said printed circuit.

4. The device for protecting according to claim 1, wherein said capacitive support comprises a uniform conductive coating forming a full plane over the whole surface.

5. The device for protecting according to claim 1, wherein said capacitive support is deployed as a lattice.

6. A method for protecting an electronic printed circuit board, said printed circuit comprising at least two layers, wherein the method comprises:
   - a step of laying out a conductive part uniformly spread on an insulator layer, the entirety comprising the conductive part and the insulator layer forming a capacitive support presenting a uniform electrical field over the whole surface of one of the layers of the electronic printed circuit board, said capacitive support being placed on the whole surface and being configured to deliver a reference capacitance for the whole surface;
   - a capacitive measurement step implemented by a capacitive measurement microprocessor electrically connected to said capacitive support, said microprocessor being configured to detect a variation in capacitance of said capacitive support for the whole surface; and a step of transmitting a piece of information representing said variation of capacitance when an absolute value of a difference between a capacitance measured by said capacitive measurement microprocessor and said reference capacitance exceeds a predetermined threshold.

7. The method for protecting according to claim 6, wherein the method further comprises a calibration step delivering said reference capacitance.

8. A payment terminal comprising:
- an electronic printed circuit board comprising at least two layers;
- a device for protecting the electronic printed circuit board, wherein the device comprises:
  - a conductive part uniformly spread on an insulator layer, the entirety comprising the conductive part and the insulator layer forming a capacitive support presenting a uniform electrical field over the whole surface of one of the layers of the electronic printed circuit board, said capacitive support being placed on the whole surface and being configured to deliver a reference capacitance for the whole surface;
  - a capacitive measurement microprocessor electrically connected to said capacitive support, said microprocessor being configured to detect a variation in capacitance of said capacitive support for the whole surface; and
  - a transmitter configured for transmitting a piece of information representing said variation of capacitance when an absolute value of a difference between a capacitance measured by said capacitive measurement microprocessor and said reference capacitance exceeds a predetermined threshold.

9. A computer program comprising program code instructions recorded on a non-transitory computer-readable memory to implement a method for protecting an electronic printed circuit board comprising at least two layers, when the program is executed by a processor, wherein the method comprises:
- laying out a conductive part uniformly spread on an insulator layer, the entirety comprising the conductive part and the insulator layer forming a capacitive support presenting a uniform electrical field over the whole surface of one of the layers of the electronic printed circuit board, said capacitive support being placed on the whole surface and being configured to deliver a reference capacitance for the whole surface;
- a capacitive measurement step implemented by a capacitive measurement microprocessor electrically connected to said capacitive support, said microprocessor being configured to detect a variation in capacitance of said capacitive support for the whole surface; and
- transmitting a piece of information representing said variation of capacitance when an absolute value of a difference between a capacitance measured by said capacitive measurement microprocessor and said reference capacitance exceeds a predetermined threshold.

\* \* \* \* \*